US012023933B2

(12) United States Patent
Wada

(10) Patent No.: US 12,023,933 B2
(45) Date of Patent: *Jul. 2, 2024

(54) INKJET PRINTER

(71) Applicant: BROTHER KOGYO KABUSHIKI KAISHA, Nagoya (JP)

(72) Inventor: Tomohiro Wada, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/750,925

(22) Filed: May 23, 2022

(65) Prior Publication Data

US 2022/0281225 A1 Sep. 8, 2022

Related U.S. Application Data

(63) Continuation of application No. 16/257,343, filed on Jan. 25, 2019, now Pat. No. 11,345,155.

(30) Foreign Application Priority Data

Feb. 7, 2018 (CN) ........................ 201820212146.6

(51) Int. Cl.

| | |
|---|---|
| ***B41J 29/38*** | (2006.01) |
| ***B41J 2/17*** | (2006.01) |
| ***B41J 2/175*** | (2006.01) |
| ***B41J 29/02*** | (2006.01) |
| ***B41J 29/13*** | (2006.01) |

(52) U.S. Cl.

CPC ............ *B41J 2/1721* (2013.01); *B41J 2/175* (2013.01); *B41J 2/1752* (2013.01); *B41J 2/17553* (2013.01); *B41J 29/02* (2013.01); *B41J 29/13* (2013.01); *B41J 2002/1728* (2013.01)

(58) Field of Classification Search

CPC ... B41J 2/1721; B41J 2/175; B41J 2002/1728

See application file for complete search history.

(56) References Cited

U.S. PATENT DOCUMENTS

| | | | |
|---|---|---|---|
| 2005/0175388 A1 | 8/2005 | Namekawa et al. | |
| 2009/0219339 A1 | 9/2009 | Harada | |
| 2012/0218348 A1* | 8/2012 | Okamoto ............. | B41J 2/16523 347/36 |
| 2012/0234436 A1 | 9/2012 | Harada et al. | |
| 2012/0236074 A1 | 9/2012 | Harada et al. | |

FOREIGN PATENT DOCUMENTS

| | | |
|---|---|---|
| JP | 2012-187708 A | 10/2012 |
| JP | 2012-196798 A | 10/2012 |

* cited by examiner

*Primary Examiner* — Lam S Nguyen

(74) *Attorney, Agent, or Firm* — Merchant & Gould P.C.

(57) ABSTRACT

An inkjet printer includes a printer body, a waste ink container, and a cover member. The waste ink container includes a first engagement portion. The cover member constitutes a part of a housing of the inkjet printer and includes a second engagement portion. The second engagement portion is engageable with the first engagement portion.

16 Claims, 11 Drawing Sheets

INKJET PRINTER

CROSS-REFERENCE TO RELATED APPLICATION

This application is a continuation of U.S. patent application Ser. No. 16/257,343, filed Jan. 25, 2019, now U.S. Pat. No. 11,345,155, which claims priority from Chinese Utility Model Application No. 201820212146.6, filed on Feb. 7, 2018, which are incorporated herein by reference in their entirety.

TECHNICAL FIELD

The disclosure relates to an inkjet printer.

BACKGROUND

FIGS. 1 to 5 schematically show an example of a known inkjet printer 1. Hereinafter, for convenience of description, a direction in which the inkjet printer faces the user is defined as "front" based on the position where the user uses the inkjet printer, and an opposite direction is defined as "rear", and a left hand side of the user is defined as "left" and a right hand side of the user is "right".

As depicted in FIG. 1, the inkjet printer 1 includes a printer body 19 and a plurality of ink containers 20 disposed on one side of the printer body 19. The ink containers 20 are fixed to one side of the printer body 19 (for example, a front side close to the right end), and accommodates ink to be supplied to the printer body 19.

As depicted in FIGS. 2 to 4, a recording portion 4 including a plurality of nozzles 86 and a cleaning device 85 are disposed in the printer body 19. As depicted in FIG. 2, the recording portion 4 is reciprocable in a left-right direction in the printer body 19, and is configured to eject ink to the recording medium. As depicted in FIG. 4, when the recording portion 4 is located at the cleaning device 85, the cleaning device 85 may remove the ink remaining in the nozzles 86 of the recording portion 4.

As depicted in FIGS. 2 to 5, the inkjet printer 1 further includes a waste ink container 9 that is detachably attached to the printer body 19. As depicted in FIG. 2, a fluid passage 10 is provided between the waste ink container 9 and the cleaning device 85, so that the ink removed by the cleaning device 85, i.e. the waste ink, may be transported to the waste ink container 9 through the fluid passage 10.

As depicted in FIGS. 1, 2 and 5, the inkjet printer 1 further includes a cover member 11 configured to cover an exterior of the waste ink container 9. The cover member 11 is fixed to the printer body 19 by a fastener 87, such as a screw, so that replacing the waste ink container 9 requires the following steps of: unscrewing the fastener 87; removing the cover member 11; removing the waste ink container 9; attaching a new waste ink container; attaching the cover member 11; and screwing the fastener 87. Such steps are cumbersome, take a lot of time, and are inconvenient for the user.

SUMMARY

According to the one or more aspects of the present disclosure, an inkjet printer may include a printer body, a waste ink container, and a cover member. The waste ink container may include a first engagement portion. The cover member may constitute a part of a housing of the inkjet printer and include a second engagement portion. The second engagement portion may be configured to be engaged with the first engagement portion.

BRIEF DESCRIPTION OF THE DRAWINGS

Aspects of the disclosure are illustrated by way of example and not by limitation in the accompanying figures in which like reference characters indicate similar elements.

DETAILED DESCRIPTION

Figure 1:
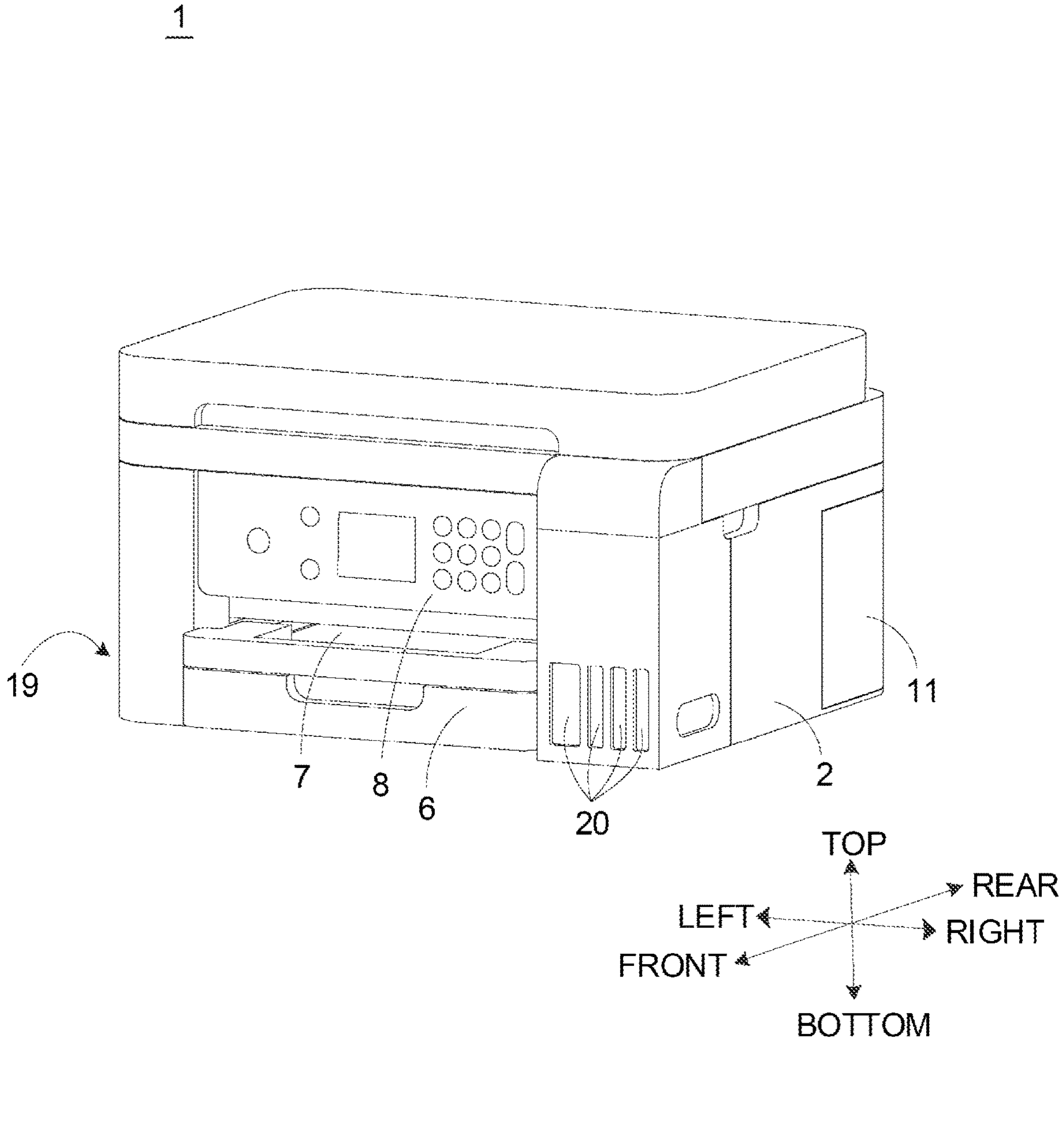
FIG. 1 is a perspective view depicting a known inkjet printer when viewed from the front.

For a more complete understanding of the present disclosure, needs satisfied thereby, and the objects, features, and advantages thereof, reference now is made to the following descriptions taken in connection with the accompanying drawings. Hereinafter, illustrative embodiments of the disclosure will be described in detail with reference to the accompanying drawings. The terms "front", "rear", "left", "right", "top" and "bottom" are used herein for the purpose of illustration and not of limitation. The terms "first" and "second" referenced herein are merely identification and do not have any other meaning, such as a particular order. For example, the term "first component" does not imply the presence of "second component", and the term "second component" does not imply the presence of "first component". The term "parallel" and "perpendicular" referenced herein may include meaning of "substantially parallel" and "substantially perpendicular" respectively.

The inkjet printer according to the disclosure may have various functions such as an image scanner function, a facsimile function and a copier function, in addition to a printing function. The printing function may include a double-sided image recording function capable of recording an image on both sides of a single sheet.

As depicted in FIGS. 1 to 4, the inkjet printer 1 includes a printer body 19 and a plurality of ink containers 20.

The printer body 19 has a substantially rectangular parallelepiped shape. In the printer body 19 disposed are a sheet feed cassette 6 for supplying a recording medium, a sheet discharge cassette 7 for discharging the recording medium, a recording portion 4 including a plurality of nozzles 86 and configured to eject ink to the recording medium, and a cleaning device 85 configured to remove the ink remaining in the nozzle 86 of the recording portion 4. A pivotable operation panel 8 is provided on the front surface of the printer body 19. The operation panel 8 includes a display panel for displaying various information and setting contents, and operation buttons for performing various operations or inputting setting contents.

The ink containers 20 are disposed at the front right side of the printer body 19. According to requirements, however, the ink containers 20 may be also disposed at other locations of the printer body 19. Further, the ink containers 20 may be removable from the printer body 19.

As depicted in FIG. 1, the inkjet printer 1 includes four ink containers 20 arranged in the left-right direction. Each of the four ink containers 20 may contain different colors of ink, e.g., cyan, magenta, yellow, and black (CMYK), respectively, to be used to record the color image. Each of the four ink containers 20 may contain one color of ink.

Figure 2:
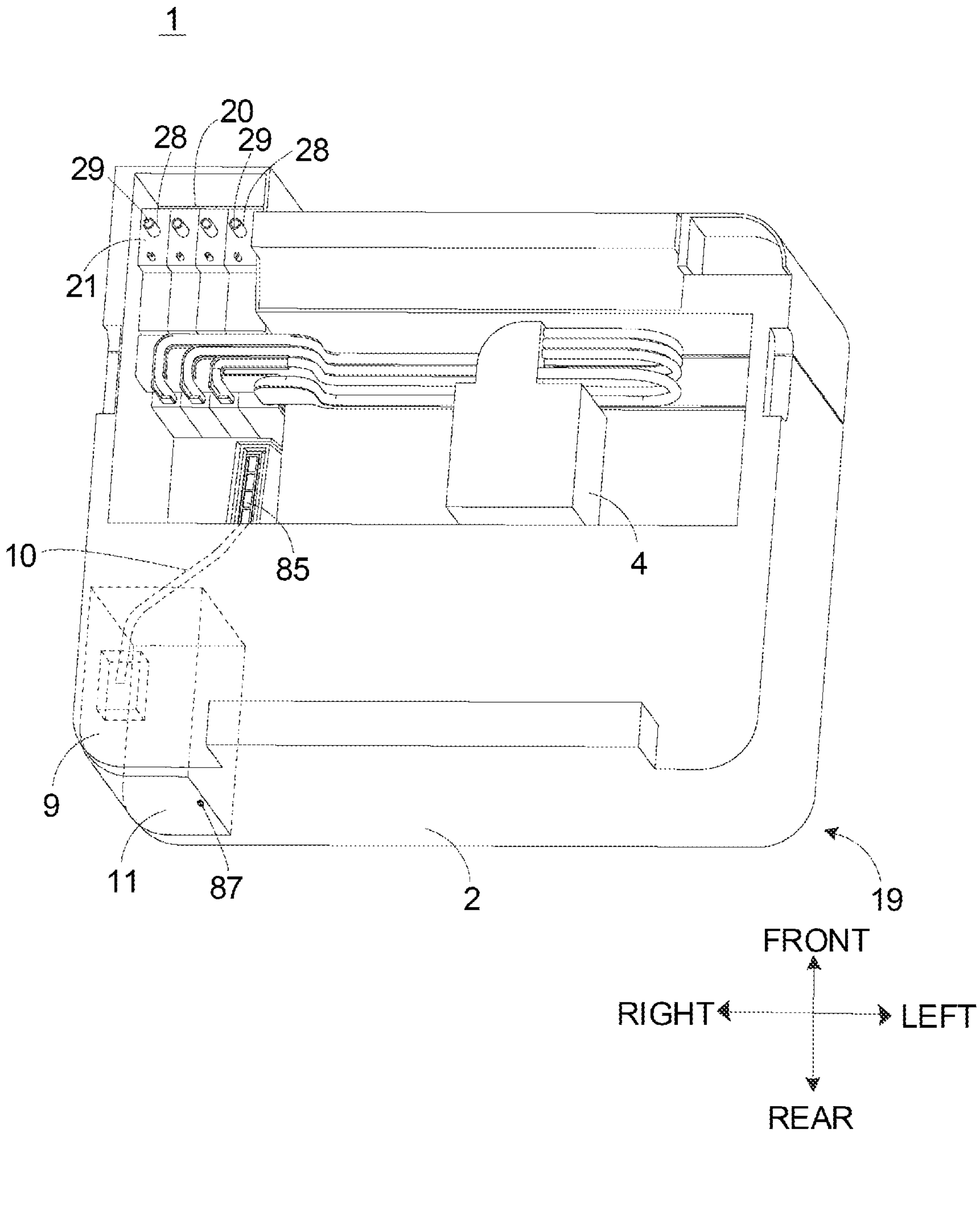
FIG. 2 is a perspective view depicting the inkjet printer of FIG. 1 when viewed from above, in which a part of the housing of the inkjet printer is omitted for the sake of clarity.
Figure 3:
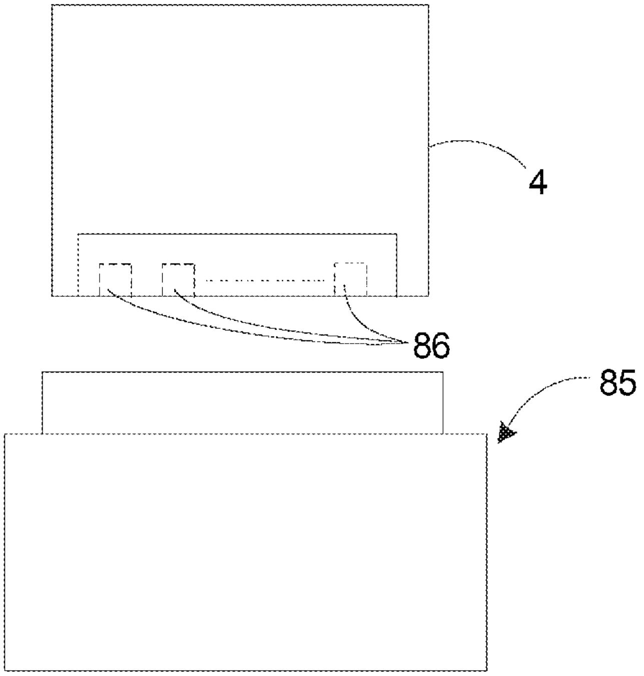
FIG. 3 is a simplified schematic view depicting the cleaning device and the recording portion of the inkjet printer of FIG. 2, in which the recording portion is not engaged with the cleaning device.
Figure 4:
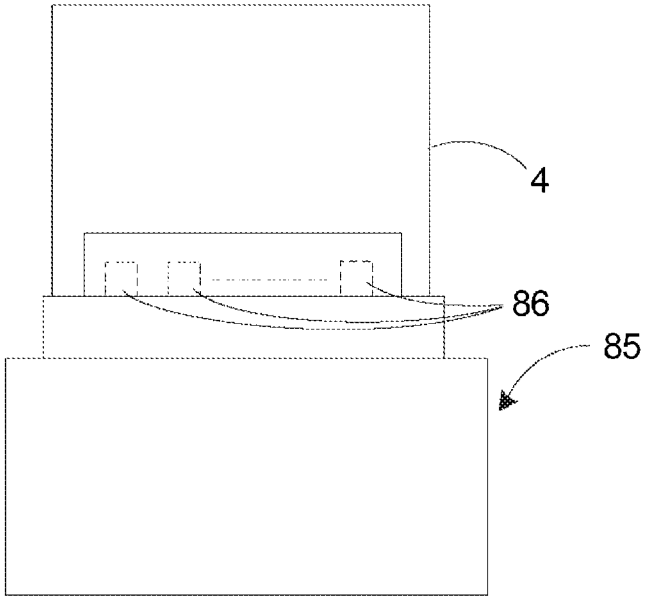
FIG. 4 is another simplified schematic view depicting the cleaning device and the recording portion of the inkjet printer of FIG. 2, in which the recording portion is engaged with the cleaning device.
Figure 5:
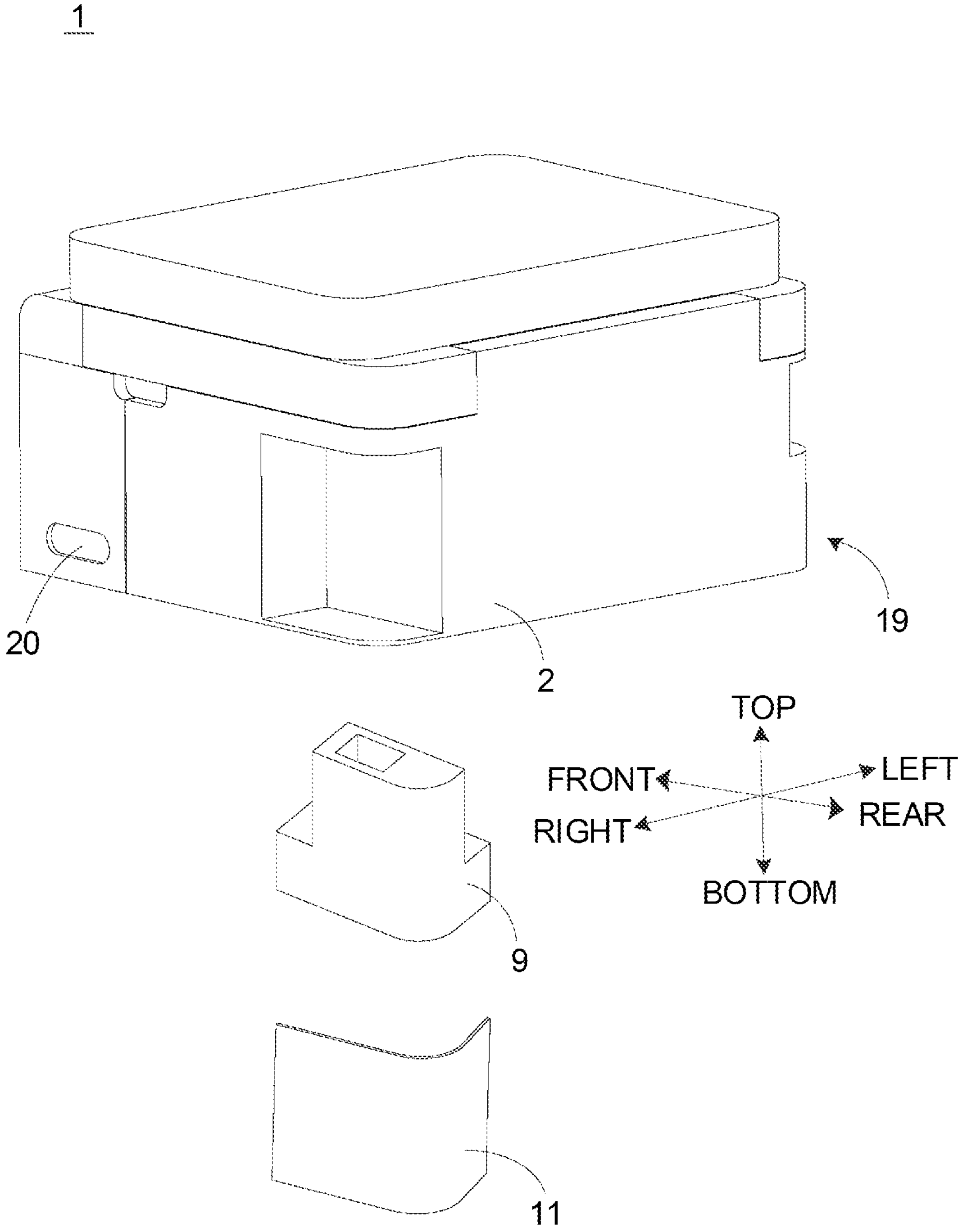
FIG. 5 is a perspective view depicting the inkjet printer of FIG. 1 when viewed from the rear, in which the waste ink container and the cover member are detached from the printer body.
Figure 6:
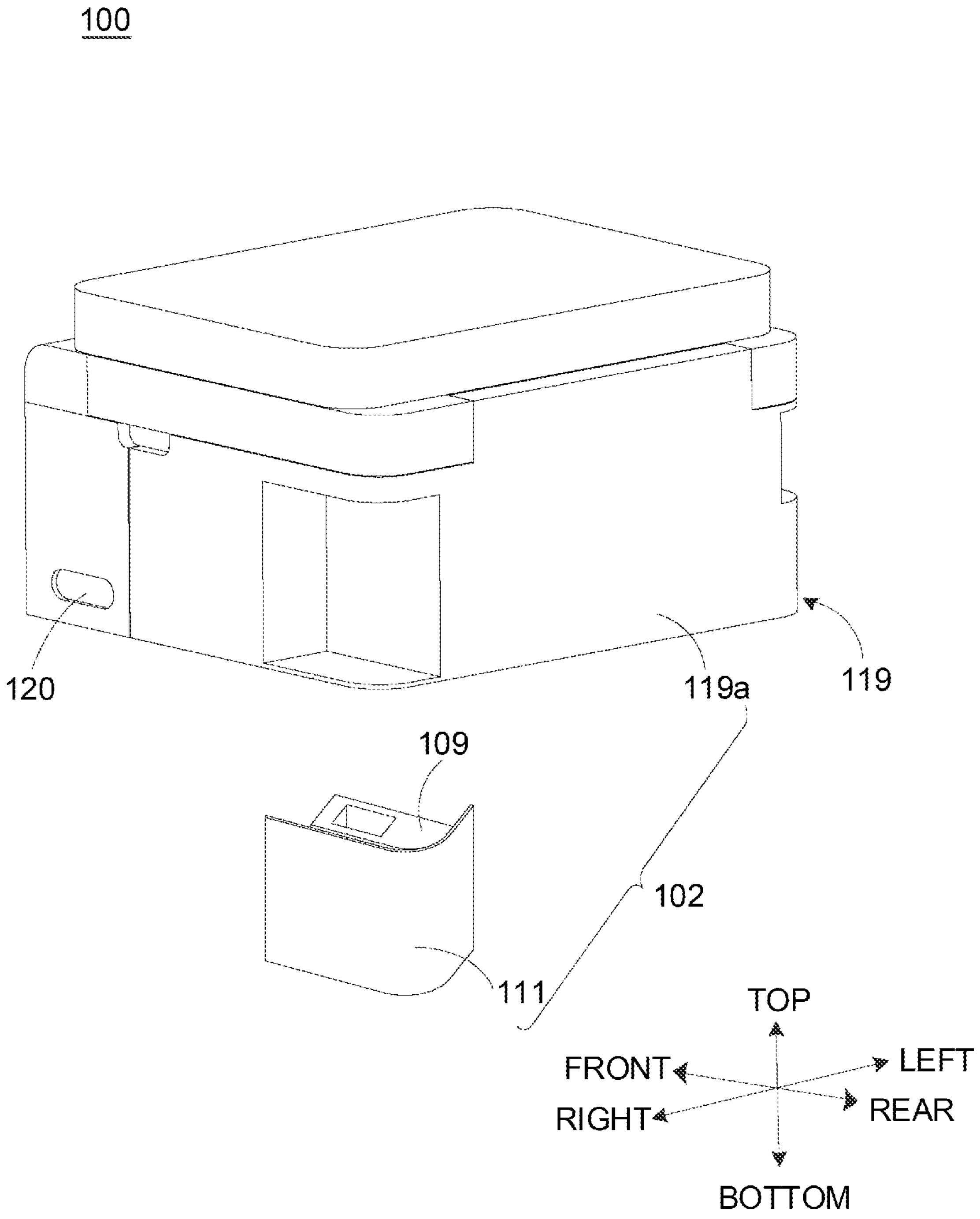
FIG. 6 is a perspective view depicting an inkjet printer according to a first and a second embodiments of the disclosure when viewed from the rear, in which the waste ink container and the cover member are integrally detached from the printer body.

As depicted in FIGS. 1 and 2, each of the ink containers 20 includes a main body portion 21 and a refill portion 28 disposed above the main body portion 21. The main body portion 21 is configured to contain the ink to be supplied to the printer body 19. The refill portion 28 includes a refill port 29 communicating an inner space of the main body portion 21 to allow the user to pour ink into the main body portion 21 therethrough.

First Embodiment

The inkjet printer 100 according to the first embodiment of the disclosure will be described below with reference to FIGS. 6 to 11. The inkjet printer 100 according to the first embodiment has substantially the same structure as the known inkjet printer 1 except for the structures of the waste ink container and the cover member. Therefore, for the sake of brevity, only the structures associated with the waste ink container and the cover member will be described below.

As depicted in FIGS. 6 to 11, the inkjet printer 100 includes a waste ink container 109 and a cover 111. The waste ink container 109 is detachably attached to a printer body 119, and is configured to store the ink, i.e. the waste ink, transferred from the cleaning device 85. Specifically, the waste ink container 109 includes a frame body 109*a* and an ink absorber 109*b* disposed inside the frame body 109*a*. The ink absorber 109*b* may be water-absorbing material, such as a water-absorbing resin or a sponge. The cover member 111 covers a part of the exterior of the waste ink container 109. The outline of the cover member 111 substantially follows the outline of the part of the exterior of the waste ink container 109. The cover member 111 is also a part of a housing 102 of the inkjet printer 100 when the waste ink container 109 and the cover member 111 are attached to the printer body 119.

An outer surface of the waste ink container 109 is provided with two first engagement portions 110 that are arranged in the horizontal direction. Correspondingly, the inner surface of the cover member 111 is provided with two second engagement portions 112 that are arranged in the horizontal direction. Each of the second engagement portion 112 is engageable with each of the first engagement portion 110. The waste ink container 109 and the cover member 111 are capable of being integrally attached to or detached from an outer casing 119*a* of the printer body 119 while each of the second engagement portion 112 is engaged with each of the first engagement portion 110. This configuration may simplify attaching/detaching the waste ink container 109 and the cover member 111, and may require less attaching/detaching time.

Figure 7:
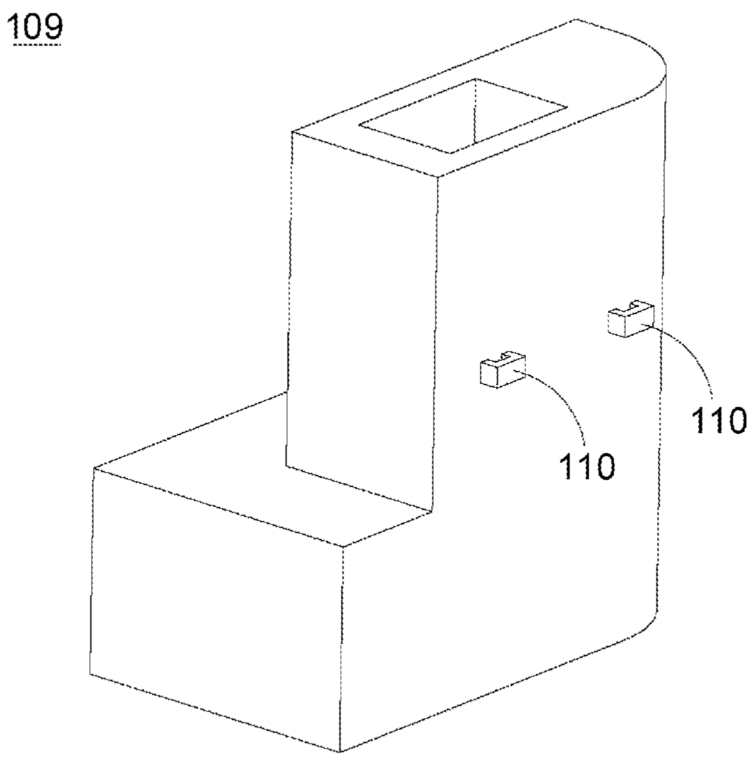
FIG. 7 is a perspective view depicting the waste ink container of the inkjet printer according to a first embodiment of the disclosure.
Figure 8:
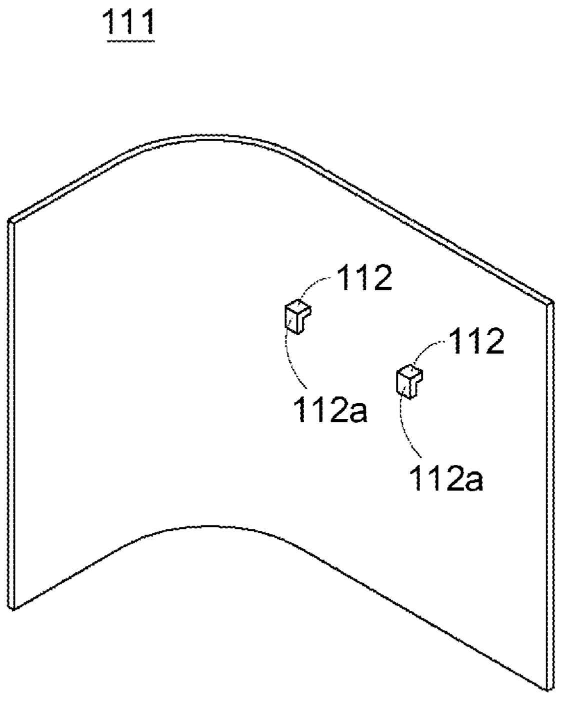
FIG. 8 is a perspective view depicting the cover member of the inkjet printer according to the first embodiment of the disclosure.
Figure 9:
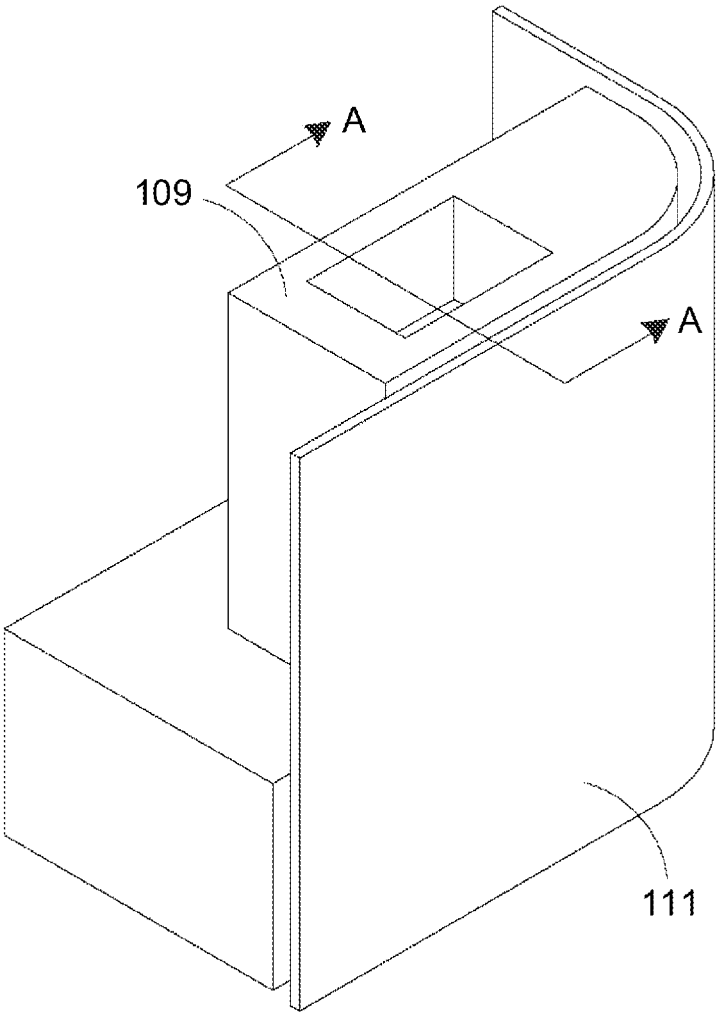
FIG. 9 is a perspective view depicting the waste ink container and the cover member of the inkjet printer according to the first embodiment of the disclosure, in which the cover member is engaged with the waste ink container.
Figure 10:
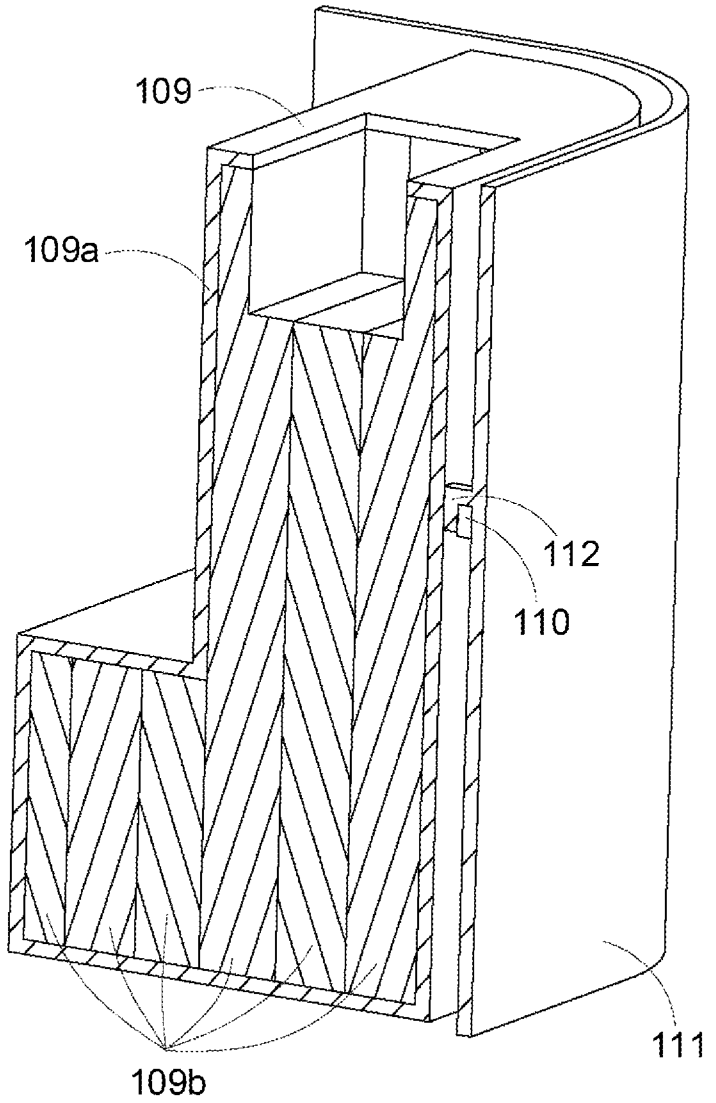
FIG. 10 is a cross-sectional view taken along a line A-A of FIG. 9.

As depicted in FIGS. 7, 8 and 10, the first engagement portion 110 has two parallel columns extending horizontally away from the outer surface of the waste ink container 109, and a bridging part that horizontally connects the two columns such that the bridging part is spaced away from the outer surface of the waste ink container 109. Correspondingly, the second engagement portion 112 has a substantially L-shape. The horizontal section of the L-shaped second engagement portion 112 extends horizontally away from the inner surface of the cover member 111. The vertical section 112*a* of the second engagement portion 112 extends downwardly away from an end of the horizontal section such that the vertical section 112*a* is spaced from the inner surface of the cover member 111. The vertical section 112*a* of the second engagement portion 112 may be slidably inserted into or removed from a space between the bridging part of the first engagement portion 110 and the outer surface of the waste ink container 109 in the vertical direction, thereby the first engagement portion 110 is engaged or disengaged with the second engagement portion 112. This configuration enables a user to readily handle the waste ink container 109 and the cover member 111.

It would be understood that although the two first engagement portions 110 and the two second engagement portions 112 are depicted in FIGS. 7 and 8, a person skilled in the art may also provide less or more first engagement portions 110 and second engagement portions 112 according to requirements. For example, one or three or more first engagement portions 110 and second engagement portions 112 may be provided.

Figure 11:
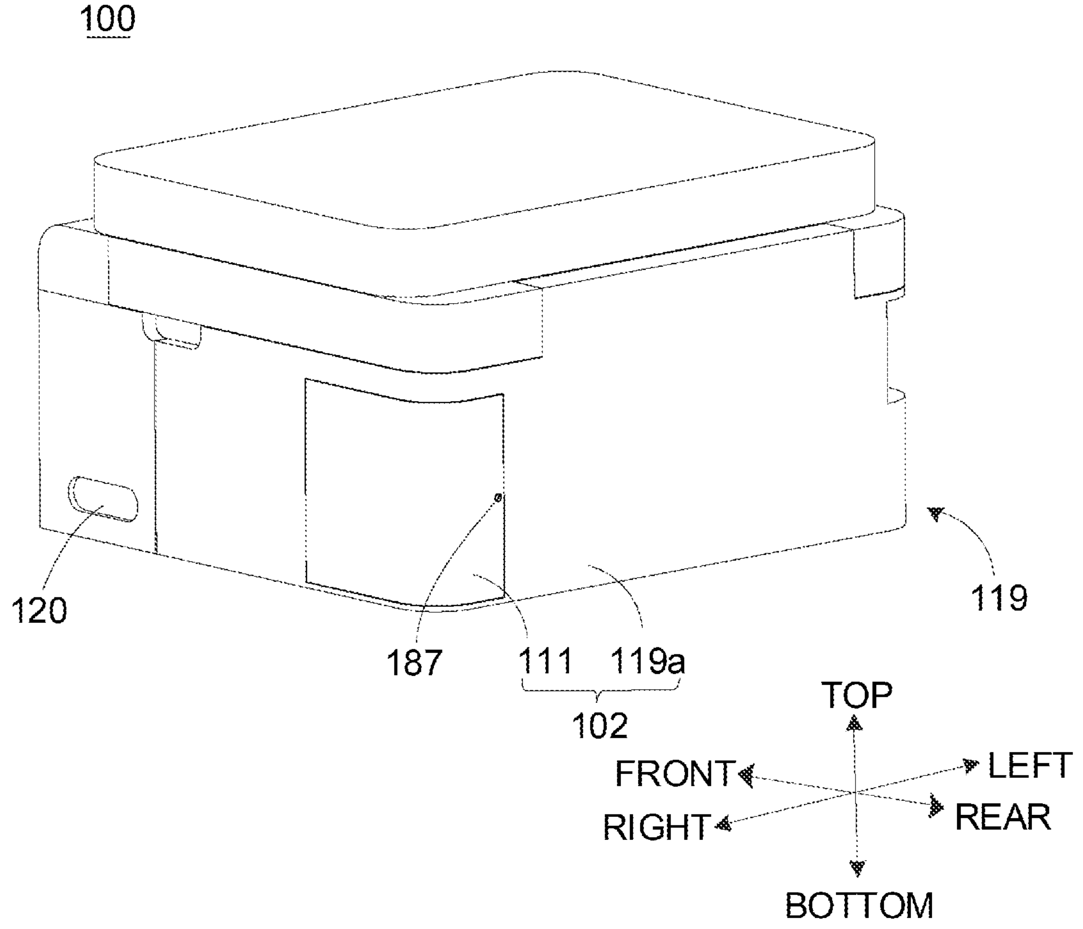
FIG. 11 is a perspective view depicting the inkjet printer of FIG. 6, in which with the waste ink container and the cover member are attached to the printer body.

As depicted in FIG. 11, when the waste ink container 109 and the cover member 111 are attached to the printer body 119, an outer surface of the cover member 111 is flush with an outer surface of the outer casing 119*a* of the printer body 119. This structure may enhance the integrity of the inkjet printer 100 and may enable the user to easily clean the housing 102 of the inkjet printer 100.

Preferably, material of the cover member 111 may be the same as material of the outer casing 119*a* of the printer body 119. For example, the cover member 111 and the outer casing 119*a* of the printer body 119 may both be made of resin material, thereby simplifying the manufacturing process of the inkjet printer 100.

Further preferably, surface treatment of the cover member 111 may be the same as surface treatment of the outer casing 119*a* of the printer body 119. This may simplify the steps of surface treatment and make it easier to manufacture.

Preferably, the color of the cover member 111 may be the same as the color of the outer casing 119*a* of the printer body 119. For example, the cover member 111 and the outer casing 119*a* of the printer body 119 may both be black. This may enhance the integrity of the inkjet printer 100 and make the inkjet printer 100 more aesthetically pleasing.

Second Embodiment

Figure 12:
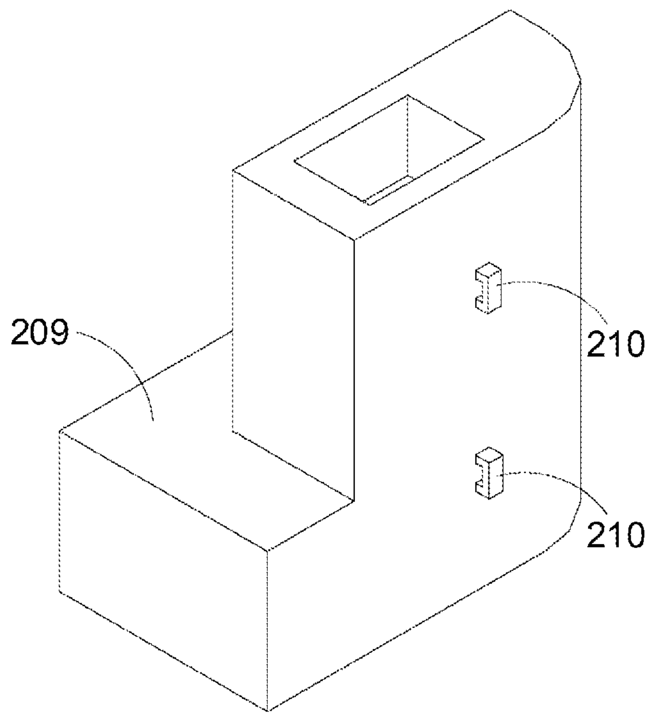
FIG. 12 is a perspective view depicting the waste ink container of the inkjet printer according to a second embodiment of the disclosure.
Figure 13:
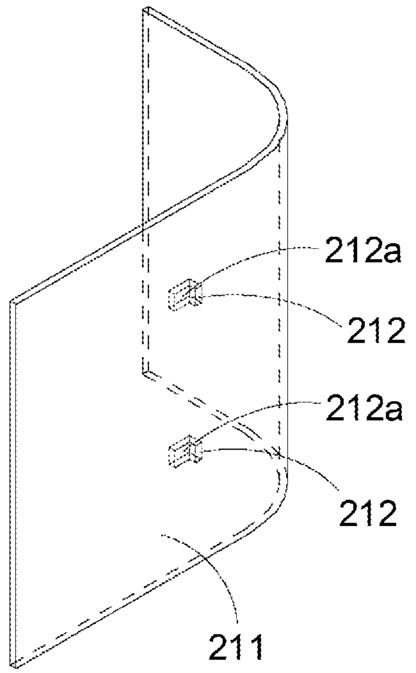
FIG. 13 is a perspective view depicting the cover member of the inkjet printer according to the second embodiment of the disclosure.
Figure 14:
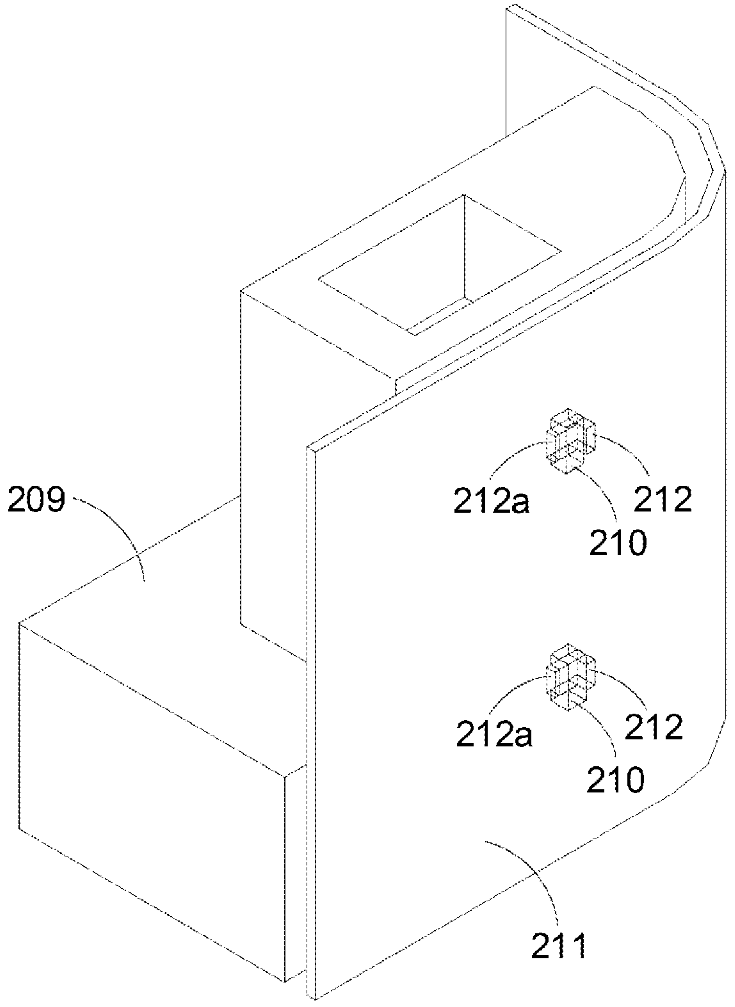
FIG. 14 is a perspective view depicting the waste ink container and the cover member of the inkjet printer according to the second embodiment of the disclosure, in which the cover member is engaged with the waste ink container.

FIGS. 12 to 14 depict a waste ink container 209 and a cover member 211 of the inkjet printer in a second embodiment according to one or more aspects of the disclosure. The inkjet printer according to the second embodiment has substantially the same structure as the inkjet printer 100 according to the first embodiment. Structures with similar configurations and functions are given similar reference numerals, respectively. Hereinafter, only the differences will be described.

As depicted in FIGS. 12 to 14, in the second embodiment, the outer surface of the waste ink container 209 is provided with two first engagement portions 210 that are arranged in the vertical direction. Correspondingly, the inner surface of the cover member 211 is provided with two second engagement portions 212 that are arranged in the vertical direction. Each of the second engagement portion 212 is engageable with each of the first engagement portion 210. The waste ink container 209 and the cover member 211 are capable of being integrally attached to or detached from the printer body 119 while each of the second engagement portion 212 is engaged with each of the first engagement portion 210. This configuration may simplify attaching/detaching the waste ink container 209 and the cover member 211, and may require less attaching/detaching time.

In the second embodiment, the first engagement portion 210 has two parallel columns extending horizontally away from the outer surface of the waste ink container 209, and a bridging part that vertically connects the two columns such that the bridging part is spaced away from the outer surface of the waste ink container 209. Correspondingly, the second engagement portion 212 has a substantially L-shape. The first horizontal section of the L-shaped second engagement portion 212 extends horizontally away from the inner surface of the cover member 211. The second horizontal section 212*a* of the second engagement portion 212 extends horizontally and perpendicularly away from an end of the first horizontal section such that the second horizontal section 212*a* is spaced from the inner surface of the cover member 211. The second horizontal section 212*a* of the second engagement portion 212 may be slidably inserted into or removed from a space between the bridging part of the first engagement portion 210 and the outer surface of the waste ink container 209 in the horizontal direction, thereby the first engagement portion 210 is engaged or disengaged with the second engagement portion 212. This configuration enables a user to readily handle the waste ink container 209 and the cover member 211.

It would be understood that although the two first engagement portions 210 and the two second engagement portions 212 are depicted in FIGS. 12 and 13, a person skilled in the art may also provide less or more first engagement portions 210 and the second engagement portions 212 according to requirements. For example, one or three or more first engagement portions 210 and second engagement portions 212 may be provided.

In the inkjet printer according to the disclosure, the first engagement portion is disposed on the waste ink container, and the second engagement portion engageable with the first engagement portion is disposed on the cover member, so that the waste ink container and the cover member may be integrally attached to or detached from the printer body while the first engagement portion is engaged with the second engagement portion. This configuration may simplify attaching/detaching the waste ink container and the cover member, and may require less attaching/detaching time, thereby improving the usability.

While the disclosure has been described in detail with reference to the specific embodiments thereof, these are merely examples, and various changes, arrangements and modifications may be applied therein without departing from the spirit and scope of the disclosure.

What is claimed is:

1. A printer comprising:

a printer body;

a waste container configured to store waste generated during a printing process, the waste container being configured to be detachably attached with respect to the printer body; and a cover member configured to constitute a part of a housing of the printer, the cover member being configured to be detachably attached with respect to the printer body, wherein the cover member is completely detachable from the printer body, wherein the cover member is detachably attached to the waste container such that the cover member and the waste container are integrally detachable from the printer body when the cover member is attached to the waste container.

2. The printer according to claim 1, wherein the waste container includes a first engagement portion and is detachably attached with respect to the printer body via the first engagement portion, and the cover member includes a second engagement portion and is detachably attached with respect to the printer body via the second engagement portion.

3. The printer according to claim 2, wherein the first engagement portion is engageable with the second engagement portion.

4. The printer according to claim 3, wherein the waste container and the cover member is integrally attached to or detached from the printer body in a state where the first engagement portion is engaged with the second engagement portion.

5. The printer according to claim 1, wherein the waste container stores waste liquid.

6. The printer according to claim 1, wherein the printer is an inkjet printer and the waste container stores waste ink.

7. The printer according to claim 1, wherein when the waste container and the cover member are attached to the printer body, an outer surface of the cover member is flush with an outer surface of the printer body.

8. The printer according to claim 7, wherein material of the cover member is the same as material of an outer casing of the printer body.

9. The printer according to claim 8, wherein surface treatment of the cover member is the same as surface treatment of the outer casing of the printer body.

10. The printer according to claim 1, wherein the cover member constitutes a part of a rear outer surface of the printer body.

11. The printer according to claim 1, wherein the cover member constitutes a part of a side outer surface of the printer body.

12. The printer according to claim 1, wherein the cover member covers a corner of the housing of the printer.

13. The printer according to claim 1, wherein the waste container is positioned on a corner of the printer.

14. A waste container for a printer, the waste container being configured to store waste generated during a printing process, wherein the printer comprises:

a printer body;

the waste container configured to be detachably attached with respect to the printer body; and a cover member configured to constitute a part of a housing of the printer, the cover member being configured to be detachably attached with respect to the printer body, wherein the cover member is completely detachable from the printer body, wherein the cover member is detachably attached to the waste container such that the cover member and the waste container are integrally detachable from the printer body when the cover member is attached to the waste container.

15. A waste container for a printer, comprising:

a body configured to store waste generated during a printing process; and a first engagement portion configured to interlock with a second engagement portion of a cover member configured to constitute a part of a housing of the printer, wherein the waste container and the cover member are integrally attached to and detached from the printer in a state where the first engagement portion is engaged with the second engagement portion.

16. An attachable member for a printer, comprising:

a container; and a cover member configured to constitute a part of a housing of the printer, wherein the container comprises:

a body configured to store waste generated during a printing process; and a first engagement portion, wherein the cover member comprises a second engagement portion configured to interlock with the first engagement portion, and wherein the waste container and the cover member are integrally attached to and detached from the printer in a state where the first engagement portion is engaged with the second engagement portion.

* * * * *